United States Patent
Altheimer et al.

(10) Patent No.: US 9,910,294 B2
(45) Date of Patent: Mar. 6, 2018

(54) EYEGLASS OPTIMIZATION USING AN INDIVIDUAL EYE MODEL

(71) Applicant: Rodenstock GmbH, Munich (DE)

(72) Inventors: Helmut Altheimer, Baisweil-Lauchdorf (DE); Wolfgang Becken, Munich (DE); Gregor Esser, Munich (DE); Anne Seidemann, Munich (DE); Werner Mueller, Munich (DE)

(73) Assignee: Rodenstock GmbH, Munich (DE)

( * ) Notice: Subject to any disclaimer, the term of this patent is extended or adjusted under 35 U.S.C. 154(b) by 696 days.

(21) Appl. No.: 14/371,376

(22) PCT Filed: Jan. 11, 2013

(86) PCT No.: PCT/EP2013/000073
§ 371 (c)(1),
(2) Date: Jul. 9, 2014

(87) PCT Pub. No.: WO2013/104548
PCT Pub. Date: Jul. 18, 2013

(65) Prior Publication Data
US 2015/0002810 A1    Jan. 1, 2015

(30) Foreign Application Priority Data
Jan. 11, 2012 (DE) ........................ 10 2012 000 390

(51) Int. Cl.
*G06G 7/48* (2006.01)
*G02C 7/02* (2006.01)

(52) U.S. Cl.
CPC ............. *G02C 7/027* (2013.01); *G02C 7/028* (2013.01)

(58) Field of Classification Search
CPC .......... G02C 7/02; G02C 7/024; G02C 7/025; G02C 7/04; G09B 23/28; G61B 3/111;
(Continued)

(56) References Cited

U.S. PATENT DOCUMENTS 7,931,374 B2 * 4/2011 Dai ...................... A61B 3/0025
                                                                351/205
8,998,415 B2 * 4/2015 Norrby ............... A61B 3/0025
                                                                351/212
(Continued)

FOREIGN PATENT DOCUMENTS

JP    2008-542831 A    11/2008
JP    2010-517089 A     5/2010
(Continued)

OTHER PUBLICATIONS

Office Action dated Oct. 7, 2016 for Japanese Patent Application No. 2014-551573 (with English translation).
International Search Report issued for PCT/EP2013/000073.

*Primary Examiner* — Kandasamy Thangavelu
(74) *Attorney, Agent, or Firm* — Schiff Hardin LLP (57) ABSTRACT

A computer-implemented method for calculating or optimizing a spectacle lens for at least one eye of a spectacle wearer. Refraction data of the at least one eye of the spectacle wearer is collected. An individual eye model is defined, wherein the eye model defines at least the topography of a corneal front surface of the at least one eye, position and power of a lens of the eye, and a retina position of the eye such that the eye exhibits the collected refraction data. A first surface and a second surface for the spectacle lens to be calculated or optimized is specified. The path of a main ray through at least one visual point of at least one spectacle lens surface to be calculated or optimized is determined. A spherical wavefront incident on the first surface of the spectacle lens along the main ray is specified. A wavefront in the at least one eye, which results from the spherical wavefront in a surrounding of the main ray due to the power of at least the first and second surfaces of the spectacle lens, the corneal front surface, and the lens of the at least one eye is determined. The at least one spectacle lens
(Continued)

surface to be calculated or optimized is iteratively varied until an aberration of the resulting wavefront corresponds to a specified target aberration.

15 Claims, 3 Drawing Sheets

(58) Field of Classification Search
CPC ......... G61B 3/0025; G61B 3/04; A61B 3/111; A61B 3/0025; A61B 3/04
See application file for complete search history.

(56) References Cited

U.S. PATENT DOCUMENTS

| | | | | |
|---|---|---|---|---|
| 9,636,214 B2* | 5/2017 | Piers | ...................... | A61F 2/1618 |
| 9,696,563 B2* | 7/2017 | Trumm | ................... | G02C 7/027 |
| 2002/0085172 A1* | 7/2002 | Altmann | ................ | G09B 23/28 |
| | | | | 351/178 |
| 2004/0257527 A1* | 12/2004 | Qi | ............................ | A61B 3/04 |
| | | | | 351/159.74 |
| 2007/0002274 A1* | 1/2007 | Somani | ..................... | A61F 9/00 |
| | | | | 351/159.75 |
| 2008/0221674 A1* | 9/2008 | Blum | ........................ | G02C 7/04 |
| | | | | 623/5.11 |
| 2010/0145489 A1* | 6/2010 | Esser | ....................... | G02C 7/02 |
| | | | | 700/97 |
| 2010/0198515 A1* | 8/2010 | Becken | ................... | G02C 7/024 |
| | | | | 702/1 |
| 2011/0228225 A1* | 9/2011 | Liang | ....................... | G02C 7/02 |
| | | | | 351/159.01 |
| 2011/0299032 A1* | 12/2011 | Becken | .................... | G02C 7/02 |
| | | | | 351/159.74 |
| 2012/0008090 A1* | 1/2012 | Atheimer | ............... | G02C 7/025 |
| | | | | 351/159.75 |
| 2012/0033179 A1* | 2/2012 | Kratzer | ................... | A61B 3/111 |
| | | | | 351/206 |
| 2012/0188504 A1* | 7/2012 | Petignaud | ............. | G02C 7/024 |
| | | | | 351/159.74 |
| 2013/0035760 A1* | 2/2013 | Portney | .................... | G02C 7/04 |
| | | | | 623/6.13 |
| 2015/0309338 A1* | 10/2015 | Chauveau | ................ | G02C 7/02 |
| | | | | 351/204 |

FOREIGN PATENT DOCUMENTS

| | | | | |
|---|---|---|---|---|
| JP | 2010-221050 A | 10/2010 | | |
| WO | WO-02/084381 A2 | 10/2002 | | |
| WO | WO-02/088830 A1 | 11/2002 | | |
| WO | WO-2008/089999 A1 | 7/2008 | | |
| WO | WO2010/084019 A1 * | 7/2010 | ............... | G02C 7/06 |
| WO | WO 2010/124991 A1 * | 11/2010 | ............... | G02C 7/02 |

* cited by examiner

EYEGLASS OPTIMIZATION USING AN INDIVIDUAL EYE MODEL

The present invention relates to a method, an apparatus, and a corresponding computer program product for calculating (optimizing) and producing a spectacle lens by taking into account higher-order aberrations both of the eye and of the spectacle lens.

For the production or optimization of spectacle lenses, in particular of individual spectacle lenses, each spectacle lens is manufactured such that the best possible correction of a refractive error of the respective eye of the spectacle wearer is obtained for each desired direction of sight or each desired object point. In general, a spectacle lens is said to be fully correcting for a given direction of sight if the values sphere, cylinder, and axis of the wavefront, upon passing the vertex sphere, match with the values for sphere, cylinder, and axis of the prescription for the eye having the visual defect. In the refraction determination for an eye of a spectacle wearer, dioptric values (particularly sphere, cylinder, cylinder axis—i.e. in particular sphero-cylindrical deviations) for a far (usually infinite) distance and optionally (for multifocal or progressive lenses) an addition for a near distance (e.g. according to DIN 58208) are determined. In modern spectacle lenses, object distances deviating from the standard, which are used in the refraction determination, can be indicated additionally. In this way, a prescription (in particular sphere, cylinder, cylinder axis, and optionally addition) to be communicated to a spectacles producer is stipulated. Knowledge of a special or individual anatomy of the respective eye or the refractive values of the eye having the visual defect, which are actually present in the individual case, is not required here.

However, a full correction for all directions of sight at the same time is normally not possible. Therefore, the spectacle lenses are manufactured such that they achieve a good correction of visual defects of the eye and only small aberrations in the main zones of use, especially in the central visual zones, while larger aberrations are permitted in peripheral zones.

In order to be able to manufacture a spectacle lens in this way, the spectacle lens surfaces or at least one of the spectacle lens surfaces is first calculated such that the desired distribution of the unavoidable aberrations is effected thereby. This calculation and optimization is usually performed by means of an iterative variation method by minimization of a target function. As a target function, particularly a function F having the following functional relation with the spherical power S, the magnitude of the cylindrical power Z, and the axis of the cylinder a (also referred to as "SZA" combination) is taken into account and minimized:

$$F = \sum_{i=1}^{m} [g_{i,S\Delta}(S_{\Delta,i} - S_{\Delta,i,target})^2 + g_{i,Z\Delta}(Z_{\Delta,i} - Z_{\Delta,i,target})^2 + \dots ]$$

In the target function F, at the evaluation points i of the spectacle lens, at least the actual refractive deficits of the spherical power $S_{\Delta,i}$ and the cylindrical power $Z_{\Delta,i}$ as well as target specifications for the refractive deficits of the spherical power $S_{\Delta,i,target}$ and the cylindrical power $Z_{\Delta,i,target}$ are taken into consideration.

It was found in DE 103 13 275 that it is advantageous to not indicate the target specifications as absolute values of the properties to be optimized, but as their deviation from the prescription, i.e. as the required local maladjustment. The advantage is that the target specifications are independent of the prescription ($Sph_V$, $Zyl_V$, $Axis_V$, $Pr_V$, $B_V$) and that the target specifications do not have to be changed for every individual prescription. Thus, as "actual" values of the properties to be optimized, not absolute values of these optical properties are taken into account in the target function, but the deviations from the prescription. This has the advantage that the target values can be specified independent of the prescription and do not have to be changed for every individual prescription.

The respective refractive deficits at the respective evaluation points are preferably taken into consideration with weighting factors $g_{i,S\Delta}$ and $g_{i,Z\Delta}$. Here, the target specifications for the refractive deficits of the spherical power $S_{\Delta,i,target}$ and/or the cylindrical power $Z_{\Delta,i,target}$, particularly together with the weighting factors $g_{i,S\Delta}$ and $g_{i,Z\Delta}$, form the so-called spectacle lens design. In addition, particularly further residues, especially further parameters to be optimized, such as coma and/or spherical aberration and/or prism and/or magnification and/or anamorphic distortion, etc., can be taken into consideration, which is particularly implied by the expression "+ . . . " In the above-mentioned formula for the target function F.

In some cases, consideration not only of aberrations up to the second order (sphere, magnitude of the astigmatism, and cylinder axis) but also of higher order (e.g. coma, trefoil, spherical aberration) may in some cases contribute to a clear improvement particularly of an individual adaptation of a spectacle lens.

It is known from the prior art to determine the shape of a wavefront for optical elements and particularly spectacle lenses that are delimited by at least two refractive boundary surfaces. For example, this can be done by means of a numerical calculation of a sufficient number of neighboring rays, along with a subsequent fit of the wavefront data by Zernike polynomials. Another approach is based on local wavefront tracing in the refraction (cf. WO 2008/089999 A1). Here, only one single ray (the main ray) per visual point is calculated, accompanied by the derivatives of the vertex depth of the wavefront according to the transversal coordinates (perpendicular to the main ray). These derivatives can be formed up to a specific order, wherein the second derivatives describe the local curvature properties of the wavefront (such as refractive power, astigmatism), and the higher derivatives are related to the higher-order aberrations.

In the tracing of light through a spectacle lens, the local derivatives of the wavefront are calculated at a suitable position in the ray path in order to compare them with desired values obtained from the refraction of the spectacle lens wearer. As the position at which the wavefronts are evaluated, usually the vertex sphere or e.g. the principal plane of the eye for the corresponding direction of sight is considered. In this respect, it is assumed that a spherical wavefront starts at the object point and propagates up to the first spectacle lens surface. There, the wavefront is refracted and subsequently propagates to the second spectacle lens surface, where it is refracted again. The last propagation takes place from the second boundary surface to the vertex sphere (or the principal plane of the eye), where the wavefront is compared with the predetermined values for the correction of the refraction of the eye of the spectacle wearer.

To make this comparison on the basis of the determined refraction data of the respective eye, an established model of the eye having the visual defect, in which a base eye having normal vision is overlaid with a visual defect (refractive deficit), is assumed for the evaluation of the wavefront at the vertex sphere. This has proven particularly successful as further knowledge of the anatomy or optics of the respective eye (e.g. distribution of the refractive powers, eye length, length ametropia and/or refractive power ametropia) is not required. A detailed description of this model of spectacle lens and refractive deficit can be found e.g. in Dr. Roland Enders "Die Optik des Auges und der Sehhilfen", Optische Fachveröffentlichung GmbH, Heidelberg, 1995, pages 25 ff. und in Diepes, Blendowske "Optik und Technik der Brille", Optische Fachveröffentlichung GmbH, Heidelberg, 2002, pages 47 ff. As a proven model, in particular the described correction model according to REINER is used.

Here, the refractive deficit is considered to be the lack or excess of refractive power of the optical system of the eye having the visual defect compared with an equally long eye having normal vision (residual eye). The refractive power of the refractive deficit is in particular approximately equal to the distance point refraction with negative sign. For a full correction of the visual defect, the spectacle lens and the refractive deficit together from a telescopic system (afocal system). The residual eye (eye having the visual defect without added refractive deficit) is considered to have normal vision. Thus, a spectacle lens is said to be fully correcting for distance if its image-side focal point coincides with the distance point of the eye having the visual defect and thus also with the object-side focal point of the refractive deficit.

It is the object of the invention to provide an improved method for calculating or optimizing a spectacle lens, preferably a progressive spectacle lens, wherein the spectacle lens is adapted to the individual needs of the spectacle wearer in an improved way. This object is solved by a computer-implemented method, an apparatus, a computer program product, and a storage medium with the features indicated in the independent claims. Preferred embodiments are subject of the dependent claims.

According to a first aspect, the invention provides a computer-implemented method for calculating or optimizing a spectacle lens for at least one eye of a spectacle wearer. To this end, first refraction data of the at least one eye of the spectacle wearer is collected. The refraction data at least comprise the spherical and astigmatic visual defects of the eye. In a preferred embodiment, the collected refraction data also describe higher-order aberrations (HOA). Preferably, the refraction data (also referred to as aberrometric data) is measured by an optician, for example, by means of an aberrometer (objective refraction data). Alternatively or in addition, a subjectively determined refraction can be used as well. Subsequently, the refraction data will preferably be communicated to a spectacles producer and/or provided to a calculation or optimization program. They are therefore available to be collected, in particular to be read out and/or received in digital form. Specifically, this step can be performed in the same way as in conventional calculation or optimization methods for spectacle lenses.

Other than the conventional methods, the method according to the invention now comprises a step of specifying an individual eye model, which at least specifies certain specifications on the geometric and optical properties of the eye. For example, in the individual eye model according to the invention, at least the topography of a corneal front surface of the at least one eye, a length of the eye (also referred to as the imaging length $L_A$), which describes a position of the retina of the eye, and a position and power of a lens of the eye are specified in a specific way, namely such that the eye described by the eye model exhibits the collected refraction data. In the simplest case of an eye model, the refraction of the eye is determined by the optical system consisting of the corneal front surface, the eye lens, and the retina. In this simple model, the refraction of the eye is specified by the refraction of light on the corneal front surface and the refractive power of the eye lens (preferably including the spherical and astigmatic aberrations and higher-order aberrations) together with their position relative to the retina, which is/are preferably specified by the eye length. Preferably, the topography of the corneal front surface is measured individually, and the eye lens of the individual eye model is calculated accordingly to satisfy the individually determined refraction data.

A first surface and a second surface of the spectacle lens are particularly specified as starting surfaces for the calculation and optimization of the spectacle lens. In a preferred embodiment, only one of the two surfaces is optimized. Preferably, this will be the back surface of the spectacle lens. Preferably, a corresponding starting surface is specified both for the front surface and for the back surface of the spectacle lens. In a preferred embodiment, only one surface is modified or optimized iteratively during the optimization process though. The other surface of the spectacle lens may be a simple spherical or rotationally symmetrical aspherical surface. However, it is also possible to optimize both surface.

Based on the two predetermined surfaces, the method comprises determining a path of a main ray through at least one visual point (i) of at least one surface of the spectacle lens to be calculated or optimized. The main ray describes the geometric ray path starting from an object point through the two spectacle lens surfaces, the corneal front surface and the lens of the eye preferably up to the retina of the eye.

Moreover, the method comprises specifying a spherical wavefront ($w_0$) incident on the first surface (front surface) of the spectacle lens along the main ray. This spherical wavefront describes the light originating from an object point. The curvature of the spherical wavefront when being incident on the first surface of the spectacle lens corresponds to the reciprocal of the object distance. Preferably, the method thus comprises specifying an objective distance model, which assigns an object distance to each direction of sight or each visual point of the at least one surface of the spectacle lens to be optimized. In this way, preferably the individual situation of wear, in which the spectacle lens to be produced is to be used, is described.

The wavefront incident on the spectacle lens is now refracted on the front surface of the spectacle lens preferably for the first time. Subsequently, the wavefront propagates along the main ray within the spectacle lens from the front surface to the back surface, where it is refracted for the second time. The wavefront transmitted through the spectacle lens now propagates along the main ray to the corneal front surface of the spectacle lens, where it is refracted again. After a further propagation of the wavefront within the eye to the eye lens, it is refracted there as well to finally propagate up to the retina of the eye. Depending on the optical properties of the individual optical elements (spectacle lens surfaces, corneal front surface, eye lens), each refraction process causes a deformation of the wavefront.

To attain exact imaging of the object point onto an image point on the retina, the wavefront would have to exit the eye lens preferably as a converging spherical wavefront, the curvature of which precisely corresponding to the reciprocal of the distance to the retina. However, as mentioned at the outset, a full correction of the eye's refraction for all directions of sight of the eye, i.e. for all visual points of the at least spectacle lens surface to be optimized, at the same time is generally not possible. Depending on the direction of sight, a deliberate maladjustment of the spectacle lens is preferably provided, which according to the situation of use is low in the mainly used zones of the spectacle lens (e.g. central visual points), and slightly higher in the zones not used to much (e.g. peripheral visual points). This approach is basically known from conventional optimization methods. Different to conventional methods, however, the invention suggests not performing the evaluation of the wavefront at a position between the spectacle lens and the eye, e.g. at the vertex sphere, but performing a further calculation of the wavefront up to behind the eye lens on the basis of the individual specified eye model to carry out an evaluation of the resulting wavefront there.

In a preferred embodiment, the wavefront is evaluated on the back surface of the eye lens. This is particularly advantageous if the individual eye model used describes the eye lens by means of its surfaces (front and/or back surface(s)), among others. In another preferred embodiment, the evaluation is performed at the image-side principal plane of the eye lens. This is particularly advantageous if the individual eye model used describes the eye lens by means of principal planes. However, other positions particularly between the eye lens and the retina are also possible in the eye model, in order to evaluate the resulting wavefront there. To this end, the local derivatives of the resulting wavefront are calculated preferably at the corresponding position in the ray path to compare them with the desired values of a specific target aberration (maladjustment) there. The distribution of the target aberrations across the individual visual points of the surface of the spectacle lens to be optimized together with possible weightings represents the "design" of the spectacle lens, analogous to other known methods.

To optimize the spectacle lens, the at least one surface of the spectacle lens to be calculated or optimized is varied iteratively until an aberration of the resulting wavefront corresponds to a specified target aberration, i.e. in particular deviates from a spherical wavefront, which has its center of curvature on the retina, by specified values of the aberration. This spherical wavefront is also referred to as a reference wavefront here. Preferably, the method comprises minimizing a target function F, in particular analogous to the target function describes at the outset. Further preferred target functions, in particular for consideration of higher-order aberrations, will be described further below.

Tracing of the wavefront (WF) up into the individually modeled eye, in particular up to behind the eye lens, provides an unexpectedly efficient improvement of the precision in the adaptation of spectacle lenses. Contrary to previous assumptions, it was found that the plane or surface of the evaluation (e.g. vertex sphere) plays an important role in conventional calculation methods. The result of the comparison between values in use and target values, with respect to the adaptation precision of a spectacle lens, depends much more strongly on this surface as has been assumed for conventional optimization methods so far. By individually modelling the eye and completely calculating the wavefront up into the individually modelled eye, the present invention circumvents the problem of selecting a suitable surface for evaluation of the wavefront in front of the eye. In particular, it was found that the specific selection of the position/surface for evaluation of the wavefronts within the eye, in particular behind the individually modelled eye lens, is clearly less critical to the adaptation of the spectacle lens than this is the case for conventional evaluations in front of a standard eye having a visual defect introduced in front of it. With the present invention, there is no need to discuss the selection of an appropriate plane/surface for evaluation of wavefronts.

Preferably, determining an individual eye model comprises collecting individual topographic data of the corneal front surface and/or of an individual retina position $L_A$ or a length of the at least one eye. Based thereon, determining an individual eye model preferably comprises determining (in particular calculating) the power of the lens of the eye (eye lens) such that the eye in the eye model exhibits a refraction according to the collected refraction data of the spectacle wearer. Thus, in this case, there is no need to measure the optical power (in particular the refractive power) of the eye individually and separately. Instead, it is preferably assumed that the eye's aberration determined in the refraction determination is determined by the combination of the topography of the corneal front surface, the optical power of the eye lens, as well as their relative position to one another and their position relative to the retina. Thus, as soon as the topography of the corneal front surface, its position relative to the eye lens, and the distance of the retina are specified, the optical refraction properties, in particular including the higher-order aberrations, can be determined from the refraction measurement. According to the embodiment, it is possible to individually measure the geometric parameters of the eye, in particular the relative positions (distance) of the retina and the eye lens as well as the eye length or the position of the retina relative to the eye lens and/or relative to the corneal front surface, or to specify standard values therefor, which are specified for the creation of the individual eye model. In a preferred embodiment, fixed standard values used equally for all eye models are specified for the geometric parameters. In this case, the eye model is individualized preferably by the individual measurement of the refraction and/or the retina topography.

In another preferred embodiment, a functional relation between a refraction of the eye—in particular a spherical prescription—and an eye length is specified. Such a functional relation may be based on average values of many spectacle wearers, according to which hyperopic eyes have a different length than myopic eyes as a rule. In this case, determining the individual eye model preferably comprises individually determining the eye length or a position $L_A$ of the retina relative to the eye lens or relative to the corneal front surface from the general, specified functional relation and the individual refraction of the eye.

In a further preferred embodiment, the geometric parameters of the eye, in particular the eye length and/or the distances between cornea and eye lens or between eye lens and retina, are measured individually. The same applies to further geometric parameters, such as the thickness of the cornea, the topography of the corneal back surface, or the topography of the individual lens surfaces, as well as to optical parameters, such as the refractive indices of the individual elements in the eye. They can either be measured individually or be specified as standard values.

Particularly preferably, the eye model is specified with three refractive surfaces, which in particular comprise the corneal front surface (cornea C), a lens front surface ($L_1$), and a lens back surface ($L_2$) of the lens of the eye. In particular, an eye model according to Gullstrand-Emsley or Bennett and Rabetts can be taken as a basis, with the parameters of the refractive surfaces being determined or specified individually. It turned out to be most effective to consider exactly three refractive surfaces. The eye model is thus given a very good individual adaptability, with a sufficiently small calculation/modelling effort being ensured. Thus, it was particularly found that due the low cornea thickness e.g. the separate consideration of the refraction at the corneal back surface plays such an insignificant role that it can be neglected but yet a substantial improvement with respect to conventional calculation and optimization methods is attained.

Since the last propagation in a wavefront tracing, i.e. the propagation from the vertex of the back surface $L_2$ of the eye lens to the retina, is only interesting in wave-theoretical aspects, the rearmost position relevant in geometric-optical aspects is $L_2$. Up to here (or alternatively up to the exit pupil AP of the eye), a geometric-optical WF tracing is performed to be of maximum possible significance.

A substantial progress of such a WF tracing with respect to a vertex sphere consideration is that the WF tracing takes place through the eye in the actual ray path of use. The measurement data of an aberrometer measurement however, which form the basis of a target/actual-comparison at the vertex sphere, originate from a measurement ray path that may possibly strongly deviate from the future viewing situation. The same applies to the ray path in which the results of a subjective refraction are obtained.

For this reason, the target/actual-comparison for a full WF tracing through the eye differs from the target/actual-comparison for a calculation at the vertex sphere only to the extent the ray path of use differs from the measurement ray path. These differences in the ray paths usually depend on the direction of sight. For directions of sight in which a specified spectacle lens attains full correction, they do usually not differ, as this may (ideally) be the case for vision through BF. Here, the target/actual-comparison yields the value zero in both types of calculation. On the other hand, both types of calculation possibly yield strongly different results for all directions of sight in which the full correction is missed. This applies both to the consideration of the lower-order aberrations (LOA) and to the higher-order aberrations (HOA), which are generated by the spectacle lens and the eye.

A WF tracing substantially includes the following steps:
a) determining all relevant data of the model eye from the measurement and refraction data, i.e. specifying an individual eye model; and
b) performing the actual WF tracing based on the data of the model eye, in particular in the situation of wear of the spectacle lens to be optimized.

An essential problem in the determination of all relevant data of the model eye is that not necessarily all data of C, L1, and L2, as well as all relevant lengths in the eye are known by measurements in advance. Although the data of C is available preferably due to a cornea measurement, possibly only the average values of the population are temporarily known for $L_1$ and $L_2$ as well as all relevant lengths in the eye. In general, the available data of C, $L_1$, $L_2$ and the lengths do not match with the individually determined visual defect (incl. HOA) of the spectacle wearer or are contradictory at this stage. Therefore, preferably some of this average data is neglected and individual values are instead adapted to the individual visual defect. Due to the required number of degrees of freedom, in particular $L_1$ and/or $L_2$ are a possibility here. The following preferred approaches result:
1. $L_1$ is adapted, average values are used for $L_2$ ("filling" of $L_1$)
2. $L_2$ is adapted, average values are used for $L_1$ ("filling" of $L_2$)
3. Both $L_1$ and $L_2$ are adapted in a combined way.

Thus, the approach is preferably as follows:
1. The WF tracing is performed symbolically without evaluating the formulae numerically (first part above-mentioned step b). Preferably, due to the complexity, this WF tracing is not performed purely symbolically with the exact consideration of the alternating propagation and refraction in the trihedral eye model. For example, the terms would hardly be handable even for computer-implemented symbolical calculation methods from the order n=4 at the latest. Instead, the propagation and refraction is preferably calculated alternatingly, wherein numerical values for describing the wavefronts in the Taylor representation (e.g. up to the $6^{th}$ order) can be used in intermediate steps (i.e. in particular as incident and outgoing wavefronts on the boundary surfaces).
2. Conditions to the symbolic result of the WF tracing in the measurement ray path, which result from the visual defect, are solved for the data of $L_1$ or $L_2$ (above-mentioned step a).
3. In the symbolic results of the WF tracing, the data of $L_1$ or $L_2$ is eliminated and numerals values are used (second part of above-mentioned step b). Subsequently, the WF tracing is performed in the ray path of use.

For describing propagation and refraction, preferably the following designations are used:

$$S = \begin{pmatrix} S_{xx} & S_{xy} \\ S_{xy} & S_{yy} \end{pmatrix};$$

vergence matrix of the wavefront incident on the cornea $$S' = \begin{pmatrix} S'_{xx} & S'_{xy} \\ S'_{xy} & S'_{yy} \end{pmatrix};$$

vergence matrix of the wavefront exiting at $L_2$ $$C = \begin{pmatrix} C_{xx} & C_{xy} \\ C_{xy} & C_{yy} \end{pmatrix};$$

refractive power matrix of the cornea $$L_1 = \begin{pmatrix} L_{1xx} & L_{1xy} \\ L_{1xy} & L_{1yy} \end{pmatrix};$$

surface power matrix of the lens front surface $$L_2 = \begin{pmatrix} L_{2xx} & L_{2xy} \\ L_{2xy} & L_{2yy} \end{pmatrix};$$

surface power matrix of the lens back surface $$D_{LR} = \begin{pmatrix} D_{LR} & 0 \\ 0 & D_{LR} \end{pmatrix} = \begin{pmatrix} \frac{n_{LR}}{d_{LR}} & 0 \\ 0 & \frac{n_{LR}}{d_{LR}} \end{pmatrix};$$

vergence matrix of the target WF at the lens back surface

Moreover, corresponding curvature matrices are to be considered:

$$S=W; S'=n_{LR}W';$$

$$C=(n_{CL}-1)K_C; L_1=(n_L-n_{CL})K_1; L_2=(n_{LR}-n_L)K_2;$$
$$D_{LR}=n_{LR}K_{LR}; \quad (1)$$

With these designations, a WF tracing of S for the second-order properties, i.e. the LOA of S' yields $$S' = \left(\frac{S+C}{1-\frac{d_{CL}}{n_{CL}}(S+C)} + L_1\right)\left(1 - \frac{d_L}{n_L}\left(\frac{S+C}{1-\frac{d_{CL}}{n_{CL}}(S+C)} + L_1\right)\right)^{-1} + L_2 \quad (2)$$

In the special case that $s=s_{mess}$ is the vergence matrix of the wavefronts in the measurement ray path, which are incident on the cornea, (and thus can be determined either directly from the subjective or the objective refraction), S' must correspond to a spherical wave that converges onto the retina, i.e.

$$S'_{mess} = D_{LR} \quad (3)$$

Equation (2) can be solved selectively for $L_1$ or $L_2$. Solving equation (2) for $L_1$ yields:

$$L_1 = \frac{D_{LR} - L_2}{1 + \frac{d_L}{n_L}(D_{LR} - L_2)} - \frac{S_{mess} + C}{1 - \frac{d_L}{n_{CL}}(S_{mess} + C)} \quad (4)$$

Solving equation (2) for $L_2$ yields:

$$L_2 = D_{LR} - \quad (5)$$

$$\left(\frac{S_{mess} + C}{1 - \frac{d_{CL}}{n_{CL}}(S_{mess} + C)} + L_1\right)\left(1 - \frac{d_L}{n_L}\left(\frac{S_{mess} + C}{1 - \frac{d_{CL}}{n_{CL}}(S_{mess} + C)} + L_1\right)\right)^{-1}$$

The HOAs that the outgoing wavefront includes must correspond to the sphere with radius $d_{LR}$. This means that as an extension of the $2^{nd}$ order $$W'_{xx} = \frac{1}{d_{LR}}; \quad (6)$$
$$W'_{xy} = 0;$$
$$W'_{yy} = \frac{1}{d_{LR}};$$

it must hold for the $3^{rd}$ order:

$$W'_{xxx}=0; W'_{xxy}=0; W'_{xyy}=0; W'_{yyy}=0; \quad (7)$$

and for the $4^{th}$ order:

$$W'_{xxxx} = \frac{3}{d_{LR}^3}; \quad (8)$$
$$W'_{xxxy} = 0;$$
$$W'_{xxyy} = \frac{1}{d_{LR}^3};$$
$$W'_{xyyy} = 0;$$
$$W'_{yyyy} = \frac{3}{d_{LR}^3};$$

the $5^{th}$ order:

$$W'_{xxxxx}=0; W'_{xxxxy}=0; W'_{xxxyy}=0; W'_{xxyyy}=0; W'_{xyyyy}=0; W'_{yyyyy}=0; \quad (9)$$

and the $6^{th}$ order:

$$W'_{xxxxxx} = \frac{45}{d_{LR}^5}; \quad (10)$$
$$W'_{xxxxxy} = 0;$$

$$W'_{xxxxyy} = \frac{9}{d_{LR}^5};$$
$$W'_{xxxyyy} = 0;$$
$$W'_{xxyyyy} = \frac{9}{d_{LR}^5};$$
$$W'_{xyyyyy} = 0;$$
$$W'_{yyyyyy} = \frac{45}{d_{LR}^5};$$

The general term can be obtained by correspondingly frequently deriving the spherical surface $f_{sphere}(x,y)=R-\sqrt{R^2-x^2-y^2}$.

In the above-mentioned formulae, $d_{CL}$, $n_{CL}$, $d_L$, $n_L$, $d_{LR}$, $n_{LR}$ designate the thicknesses (parameter d) or refractive indices (parameter n) of individual elements (optical media) in the model eye, in particular of the optical medium between the corneal front surface and the first lens surface (index CL), between the first and second lens surfaces (index L), and between the second lens surface and the retina (index LR).

An adaptation of HOA of $L_1$ and/or $L_2$ is preferably obtained by considering the equations (7)-(10) and correspondingly solving them for the wanted values of $L_1$ or $L_2$.

Thus, it is expedient to introduce corresponding designations like in equation (1) also for higher orders. For example, if one wishes to determine the third order $S'_{xxx}$, than it is possible to use equation (74) for the refraction in G. Esser, W. Becken, W. Müller, P. Baumbach, J. Arasa, und D. Uttenweiler: "Derivation of the refraction equations for higher order aberrations of local wavefronts at oblique incidence", JOSA A, Vol. 27, No. 2 (2010) (hereinafter referred to as "Ref[1]") and equation (55) for the propagation in G. Esser, W. Becken, W. Müller, P. Baumbach, J. Arasa, und D. Uttenweiler: "Derivation of the propagation equations for higher order aberrations of local wavefronts", JOSA A, Vol. 28, No. 11 (2011) (hereinafter referred to as "Ref [2]"). If one assumes exemplarily that all other variables with indices "xxy", "xyy", and "yyy" are to disappear, than the "xxx" component for the HOA of the outgoing vergence can be determined as $$S'_{xxx} = \beta_L^3(\beta_{CL}^3(S_{xxx} + C_{xxx}) + L_{1,xxx}) + L_{2,xxx} \quad (11)$$

$$\beta_{CL} = \frac{1}{1 - \frac{d_{CL}}{n_{CL}}(S_{xx} + C_{xx})} \quad (12)$$

with $$\beta_L = \frac{1}{1 - \frac{d_L}{n_L}(L_{1,xx} + \beta_{CL}(S_{xx} + C_{xx}))}$$

In the special case that $S_{xxx}=S_{mess,xxx}$ is the $3^{rd}$-order component of the wavefront, incident on the cornea, in the measurement ray path (and thus can be determined either directly from the subjective or the objective refraction), equation (7) or equation (11) can be solved for $L_{1,xxx}$ or $L_{2,xxx}$ for the outgoing spherical wave. This yields $$L_{1,xxx} = -\beta_L^{-3} L_{2,xxx} - \beta_{CL}^3(S_{mess,xxx} + C_{xxx}) \quad (13)$$

or $$L_{2,xxx} = -\beta_L^3(\beta_{CL}^3(S_{mess,xxx} + C_{xxx}) + L_{1,xxx}) \quad (14)$$

In view of equations (13, 14), the question arises whether the higher-order components of $L_1$ or $L_2$ can generally be determined that easily. This is indeed the case. The reason for this is that both equation (74) in Ref.[1] and equation (55) for the propagation in Ref.[2] exhibit the feature that they are linear in the highest possible orders, and the residual terms only include contributions that are at least by 1 lower than the leading order. Thereby, with known components (e.g. of $L_1$) of second order, all $3^{rd}$-order components can be determined completely. They form the basis for the calculation of the $4^{th}$-order components, etc. Solving for all components of $L_1$ or $L_2$ up to and including the $4^{th}$ order can also be implemented symbolically in the computer. In a preferred embodiment, a numerical evaluation of the terms for all solutions is nevertheless performed from the $3^{rd}$ order onward due to the increasing complexity.

If one of the variables $L_1$ or $L_2$ is adapted to the measurement values, assumptions on the other one must be made, which can e.g. be taken from literature on the population average. It is therefore advantageous to adapt that part of the lens for which the lower quality of information is available.

If $L_1$ or $L_2$ can be taken from literature equally well, than it is still not unimportant which of the two lens surfaces is adapted. If equation (2) is derived according to the components of $L_1$ and $L_2$ and if an evaluation is made for average values (index 0) of the "Bennett and Rabbett" eye as well as for emmetropic refraction, one obtains the result that the components of $L_1$ are more sensitively taken into account in S', namely by the factor 1.4. One obtains for the components of $L_1$ $$\frac{\partial S'}{\partial L_{1,xx}}\bigg|_\varnothing = \begin{pmatrix} 1.37 & 0.03 \\ 0.03 & 0.0008 \end{pmatrix}, \frac{\partial S'}{\partial L_{1,xy}}\bigg|_\varnothing = \begin{pmatrix} 0.065 & 1.37 \\ 1.37 & 0.065 \end{pmatrix}, \quad (15)$$

$$\frac{\partial S'}{\partial L_{1,yy}}\bigg|_\varnothing = \begin{pmatrix} 0.0008 & 0.03 \\ 0.03 & 1.37 \end{pmatrix},$$

and for the components of $L_2$ $$\frac{\partial S'}{\partial L_{2,xx}}\bigg|_\varnothing = \begin{pmatrix} 1 & 0 \\ 0 & 0 \end{pmatrix}, \frac{\partial S'}{\partial L_{2,xy}}\bigg|_\varnothing = \begin{pmatrix} 0 & 1 \\ 1 & 0 \end{pmatrix}, \quad (16)$$

$$\frac{\partial S'}{\partial L_{2,yy}}\bigg|_\varnothing = \begin{pmatrix} 0 & 0 \\ 0 & 1 \end{pmatrix}.$$

Further, if one assumes that mainly the LOA is decisive for as to whether $L_1$ or $L_2$ is preferred, than $L_1$ is slightly preferred for an adaptation for this reason.

If specific refraction results, aberrometer measurement data, and corneal topographic data are available, a WF tracing can then be based thereon.

In a preferred embodiment, defining an individual eye model comprises determining a wavefront incident on a first refractive surface of the to-be-defined individual eye model and a wavefront outgoing from a last refractive surface of the to-be-specified individual eye model such that the change from the incident to the outgoing wavefront describes the collected refraction data. Particularly preferably, the incident wavefront is determined as the spherical wavefront, while the outgoing wavefront realizes the refraction data of the at least one eye. Thus, it is particularly preferred that the incident wavefront be determined as a spherical wavefront that is outgoing from a point on the retina of the model eye and incident on the back lens surface $L_2$ (as the first refractive surface), while the corneal front surface of the model eye is specified as the last refractive surface from which a wavefront having wavefront aberrations corresponding to the wavefront aberrations determined in an aberration measurement of the real eye is outgoing. Thus, the real aberration measurement is reproduced very precisely in the model.

Hence, defining the individual eye model preferably comprises defining a plurality of refractive surfaces as boundary surfaces between a plurality of optical media (elements of the model eye) with different refractive indices. As described above, eye models with three refractive surfaces, in particular the corneal front surface, the lens front surface, and the lens back surface, are particularly suitable. These refractive surfaces separate the individual adjacent elements (cornea, lens, vitreous body) of the eye model from each other. In a particularly preferred embodiment, defining the individual eye model particularly comprises defining a preferably wavelength-dependent refractive index (dispersion) for each of the elements of the model eye that are separated from each other by the refractive surfaces.

Preferably, defining an individual eye model preferably comprises defining the plurality of refractive surfaces of the model eye (the eye model) such that the wavefront aberrations caused by the plurality of refractive surfaces of the model eye correspond to the aberrations actually measured at the eye of the spectacle wearer. To this end, in particular also the wavelength of the light with which the actual measurement was performed is taken into account. This is particularly preferred together with considering the dispersion of the individual elements of the model eye. For example, aberration measurements are very often performed with infrared light. The aberrations measured therewith correspond precisely to the real eye at the measurement wavelength. If due to the dispersion of the individual media in the real eye these aberrations do not correspond to the aberrations at the wavelength of the light for the later use of the spectacles (visible light), a corresponding correction of the measured aberration must be performed in order to manufacture well-adapted spectacles. This problem has been known for a long time. Conventional aberrometers usually already include this correction in their calculation in general, i.e. without taking account individual physiological parameters, and often output only the correspondingly corrected values of the aberrations.

With the help of the present invention, it is possible in a preferred embodiment to improve the individual calculation and optimization clearly by also individually considering the wavelength dependency of the aberrations at least via the individually determined surface curvatures of the individual refractive surfaces of the model eye. With the approach according to the invention, it is not required any more to consider generally corrected aberrations for the optimization. Instead, in the specification of the individual eye model, preferably the exact measurement data of the aberrations of the real eye is considered to specify the model eye such that it causes exactly theses measured aberrations, particularly precisely at the wavelength at which the measurement was performed. To this end, for the individual elements of the model eye (e.g. cornea, lens, vitreous body), one wavelength dependency (dispersion) is specified for the refractive index. Here, it is not even required to determine this dispersion individually. Instead, known literature values of known dispersions or models of dispersion can be used. Unlike the distances and/or curvatures of the individual refractive surfaces, which can vary clearly from person to person or eye to eye, the variation of the refractive indices and their dispersion for the individual media in the eye is usually very little from person to person and can even be neglected in a preferred embodiment of the invention. Different surface curvatures of the refractive surfaces can absolutely influence the wavelength dependency of the entire refraction behavior of the eye.

If the refractive surfaces are adapted such that they lead exactly to the measured aberrations for the measurement length (e.g. infrared) of an aberration measurement, this model eye (i.e. with the determined positions and curvatures of the refractive surfaces)—due to the dispersion considered for the individual media—replicates also the behavior of the real eye for visible light automatically very well. If the aberrations of the real eye have already been determined by a conventional measurement, which have been corrected in general by a conventional method to thereby provide an approximated aberration at a wavelength different to the measurement wavelength, it is particularly preferred to corrected the thus-introduced error or aberration by first calculating back to the original measured aberrations at the measurement wavelength. The individual eye model can then be determined from these aberrations as described. The transformation to visible light is performed individually by considering the dispersion of the individual elements of the model eye.

Altogether, it is particularly preferred to first define the individual eye model based on parameters of preferably positions and/or curvatures of a plurality of refractive surfaces and then to determine these parameters individually by considering the collected refraction data of the real eye e.g. in the above-described way by means of a wavefront tracing method. Here, particularly preferably, the wavelength dependency of the refractive index transition at the individual refractive surfaces or the wavelength dependency of the refractive index of individual optical elements of the model eye is specified in advance. Preferred examples of dispersions of individual elements of the eye are described e.g. in "Bennett & Rabbetts' Clinical Visual Optics", Butterworth Heinemann (2007) (e.g. chapter 15, section "Chromatic aberrations") or also in the publication of D. A. Atchison and G. Smith "Chromatic dispersions of the ocular media of human eyes", J. Opt. Soc. Am. A, Vol. 22, no. 1.

In other words, defining the individual eye model preferably comprises defining a plurality of refractive surfaces (preferably 3), at least one of which being described by a set of parameters. These parameters may be the above-described elements of the curvature matrices (in symbolic form). In particular, e.g. at least one of the two lens surfaces $L_1$ or $L_2$ can be described in this way, while possibly other refractive surfaces are fixedly set. This definition process can either be performed equally for all eyes or individually on the basis of further measurements (e.g. of the corneal front surface). Now, individual values are determined for the set of parameters such that the eye of the eye model exhibits the collected refraction data. This may be done on the basis of the above equations (4) for $L_1$ and (5) for $L_2$.

In a further aspect, it is particularly preferred that collecting refraction data of the at least one eye comprise measuring the refraction data by means of light of a measurement wavelength. Here, in turn, defining the individual eye model preferably comprises:
  specifying a wavelength dependency of the refractive index (n) at least of an optical element (e.g. cornea and/or lens and/or vitreous body) of the individual eye model; and
  determining a geometry of the optical element (e.g. position and/or curvature of the refractive surfaces) such that the eye of the eye model exhibits the measured refraction data for the specified wavelength dependency and for the measurement wavelength.

In a preferred embodiment, determining the resulting wavefront ($w_e$) is performed by means of wavefront tracing. Here, in particular the refractions of the wavefronts at the individual boundary surfaces as well as the propagation of the wavefronts between different boundary surfaces are performed by transformation of parameters that describe the curvatures of the wavefronts.

In another embodiment, ray tracing is performed particularly for calculating the propagation of the wavefronts between two refractive surfaces.

In a preferred embodiment, determining the resulting wavefront comprises:
  calculating a wavefront (in a surrounding of the main ray) refracted at the first surface of the spectacle lens from the specified spherical wavefront ($w_0$) and the specified first surface;
  calculating a wavefront propagated through the spectacle lens along the main ray from the calculated wavefront refracted at the first surface;
  calculating a wavefront ($w_{g1}$) (in a surrounding of the main ray) refracted at the second surface of the spectacle lens from the calculated wavefront, propagated through the spectacle lens, and the specified second surface;
  calculating a wavefront ($w_{g2}$) propagated along the main ray to the corneal front surface from the calculated wavefront ($w_{g1}$) refracted at the second surface;
  calculating a wavefront (in a surrounding of the main ray) refracted at the corneal front surface from the calculated wavefront ($w_{g2}$), propagated to the corneal front surface, and the topography of the corneal front surface defined by the individual eye model;
  calculating a wavefront propagated along the main ray to the lens from the calculated wavefront refracted at the corneal front surface; and
  calculating a wavefront ($w_e$) (in a surrounding of the main ray) refracted by the lens from the calculated wavefront, propagated to the lens, and the lens power defined by the individual eye model.

Depending on the embodiment, this wavefront, which is refracted by the lens, can directly be considered as the resulting wavefront, or another propagation of the wavefront refracted by the lens is calculated to obtain the resulting wavefront.

The surrounding around the main ray, within which the calculation of the wavefronts and their evaluation are performed, is preferably selected according to the individually determined (measured) pupil size. It may be selected to be different for various visual points (and thus various object distances).

Preferably, collecting refraction data for the at least one eye comprises collecting data relating to the spherical power $Sph_V$, the amount of the astigmatism $Cyl_V$, the astigmatism axis $Axis_V$, as well as at least one further higher-order refraction $HOA_V$ of the eye.

Particularly preferably, higher-order aberrations are also considered in the optimization process. Preferably, the method comprises collecting prescription or refraction data V, wherein the prescription data comprises data relating to the spherical power $Sph_V$, the amount of the astigmatism $Cyl_V$, the astigmatism axis $Axis_V$, as well as at least one further specified higher-order refraction $HOA_V$.

The higher-order aberrations can be taken into account in the target function in various ways. In a preferred embodiment, the method comprises minimizing a target function in which values of higher-order aberrations are explicitly taken into account, e.g. in the form of $$\min F = \sum_i G_{R,i}(R_{actual}(i) - R_{target}(i))^2 + G_{A,i}(A_{actual}(i) - A_{target}(i))^2 + G_{C,i}(C_{actual}(i) - C_{target}(i))^2 + G_{S,i}(S_{actual}(i) - S_{target}(i))^2 + \ldots$$

$R_{actual}(i)$ actual refraction deficit of the eye model with spectacle lens at the $i^{th}$ evaluation point, i.e. deviation of the spherical portion of the wavefront (i.e. behind the eye lens) resulting in the individual eye model for the $i^{th}$ visual point (evaluation point) from the reference wavefront (i.e. a spherical wavefront converging on the retina)

$R_{target}(i)$ required refraction deficit at the $i^{th}$ evaluation point (specification of design)

$G_{R,i}$ weighting of the refraction deficit at the $i^{th}$ evaluation point (specification of design)

$A_{actual}(i)$ actual astigmatic portion of the resulting wavefront at the $i^{th}$ evaluation point in the individual eye model $A_{target}(i)$ required astigmatic maladjustment at the $i^{th}$ evaluation point (specification of design)

$G_{A,i}$ weighting of the astigmatic maladjustment at the $i^{th}$ evaluation point (specification of design)

and additionally $C_{actual}(i)$ actual coma of the resulting wavefront at the $i^{th}$ evaluation point in the individual eye model $C_{target}(i)$ required coma at the $i^{th}$ evaluation point (specification of design)

$G_{C,i}$ weighting of coma at the $i^{th}$ evaluation point (specification of design)

$S_{actual}(i)$ actual spherical aberration of the resulting wavefront at the $i^{th}$ evaluation point $S_{target}(i)$ required spherical aberration at the $i^{th}$ evaluation point (specification of design)

$G_{S,i}$ weighting of the spherical aberration at the $i^{th}$ evaluation point (specification of design)

If the target function is extended by the terms of the higher-order aberrations, the degree of overdetermination of the system of equations to be solved will increase, whereby the stability of the optimization method may deteriorate in some cases. In a further preferred embodiment, it is therefore suggested that in the evaluation of the resulting wavefront the higher-order aberrations be not explicitly taken into account as own terms with own specifications from the design in the target function, but that they be taken into account in the form of transformed spherocylindrical values. In this case, the method preferably comprises minimizing a target function in which values of higher-order aberrations are implicitly taken into consideration via transformed values of the refractive error and the astigmatic difference, e.g. in the form of $$\min F = \sum_i G_{R,i}(R_{actual,t}(i) - R_{target}(i))^2 + G_{A,i}(A_{actual,t}(i) - A_{target}(i))^2$$

$R_{actual,t}(i)$ transformed refraction deficit of the eye model with spectacle lens at the $i^{th}$ evaluation point, i.e. transformed deviation of the spherical portion of the wavefront (i.e. behind the eye lens) resulting in the individual eye model for the $i^{th}$ visual point (evaluation point) from the reference wavefront (i.e. a spherical wavefront converging on the retina)

$R_{target}(i)$ required refraction deficit at the $i^{th}$ evaluation point (specification of design)

$G_{R,i}$ weighting of the refraction deficit at the $i^{th}$ evaluation point (specification of design)

$A_{actual}(i)$ transformed astigmatic portion of the resulting wavefront at the $i^{th}$ evaluation point in the individual eye model $A_{target}(i)$ required astigmatic refraction deficit at the $i^{th}$ evaluation point (specification of design)

$G_{A,i}$ weighting of the astigmatic refraction deficit at the $i^{th}$ evaluation point (specification of design)

The resulting wavefront is approximated in a surrounding of the main ray preferably by low-order Zernike polynomials (up to including cylinder+axis, i.e. astigmatism).

Here, the coefficients of a Zernike expansion around the main ray are not directly taken into account as values of the wavefront aberrations in the target function. Instead, use is made of transformed values of the low-order coefficients, which consider an approximation to the wavefront also in a surrounding around the main ray.

For specifying the way in which the transformed spherocylindrical refraction (in minus cylinder notation) depends on the higher-order aberrations in preferred embodiments, preferably the following functions are provided:

$$sph(u, v, w; r_0) = \frac{4\sqrt{3}}{r_0^2}\left(u + \frac{\sqrt{2}\sqrt{v^2 + w^2}}{2}\right)$$

$$zyl(v, w; r_0) = -\frac{4\sqrt{3}}{r_0^2}\sqrt{2}\sqrt{v^2 + w^2}$$

$$a(v, w; r_0) = \frac{1}{2}\arctan(w, v)$$

with $$\arctan(x, y) := \begin{cases} \arctan(y/x), & x > 0 \\ \arctan(y/x) + \pi, & x < 0, y > 0 \\ \pi, & x < 0, y = 0 \\ \arctan(y/x) - \pi, & x < 0, y < 0 \end{cases}$$

In an embodiment in which the higher-order aberrations are at least not explicitly used for the transformation of the spherocylindrical values, a transformed refraction is preferably determined by:

$$Sph(c_2^0, c_2^{-2}, c_2^2, \{c_n^m\}, r_0) = sph(c_2^0, c_2^{-2}; r_0)$$

$$cyl(c_2^0, c_2^{-2}, c_2^2, \{c_n^m\}, r_0) = cyl(c_2^{-2}, c_2^2; r_0)$$

$$A(c_2^0, c_2^{-2}, c_2^2, \{c_n^m\}, r_0) = a(c_2^{-2}, c_2^2; r_0),$$

where $c_2^0$, $c_2^{-2}$, $c_2^2$ represent second-order Zernike coefficients and $c_n^m$ with $n \geq 3$ higher-order Zernike coefficients of the wavefront in the notation of the OSA standard, cf. for example Jason Porter et al. "Adaptive Optics for Vision Science", Wiley (2006), p. 522. The parameter $r_0$ represents the pupil radius. The method preferably comprises detecting a pupil radius $r_0$. Moreover, the method preferably comprises determining second-order Zernike coefficients ($c_2^0$, $c_2^{-2}$, $c_2^2$).

A preferred embodiment taking into consideration the higher-order aberrations in the determination of the transformed spherocylindrical refraction, i.e. in a transformation of the spherocylindrical values in dependence on the second secondary coefficients, is determined by:

$$Sph(c_2^0, c_2^{-2}, c_2^2, \{c_m^n\}) = sph(c_2^0, c_2^{-2} + \sqrt{5/3}c_4^{-2}, c_2^2 + \sqrt{5/3}c_4^2)$$

$$cyl(c_2^0, c_2^{-2}, c_2^2, \{c_n^m\}) = cyl(c_2^{-2} + \sqrt{5/3}c_4^{-2}, c_2^2 + \sqrt{5/3}c_4^2)$$

$$A(c_2^0, c_2^{-2}, c_2^2, \{c_n^m\}) = a(c_2^{-2} + \sqrt{5/3}c_4^{-2}, c_2^2 + \sqrt{5/3}c_4^2)$$

A further alternative preferred embodiment is determined by:

$$Sph(c_2^0, c_2^{-2}, c_2^2, \{c_n^m\}) = sph(c_2^0 + \sqrt{5/3}c_4^{-2}, c_2^2 + \sqrt{5/3}c_4^2)$$

$$cyl(c_2^0, c_2^{-2}, c_2^2, \{c_n^m\}) = cyl(c_2^{-2} + \sqrt{5/3}c_4^{-2}, c_2^2 + \sqrt{5/3}c_4^2)$$

$$A(c_2^0, c_2^{-2}, c_2^2, \{c_n^m\}) = a(c_2^{-2} + \sqrt{5/3}c_4^{-2}, c_2^2 + \sqrt{5/3}c_4^2)$$

A further preferred embodiment is determined by:

$$Sph(c_2^0, c_2^{-2}, c_2^2, \{c_n^m\}) = sph(c_2^0 + 2\sqrt{15}c_4^0, c_2^{-2} + 3\sqrt{5/3}c_4^{-2}, c_2^2 + 3\sqrt{15}c_4^2)$$

$$cyl(c_2^0, c_2^{-2}, c_2^2, \{c_n^m\}) = cyl(c_2^{-2} + 3\sqrt{15}c_4^{-2}, c_2^2 + 3\sqrt{15}c_4^2)$$

$$A(c_2^0, c_2^{-2}, c_2^2, \{c_n^m\}) = a(c_2^{-2} + 3\sqrt{15}c_4^{-2}, c_2^2 + 3\sqrt{15}c_4^2)$$

Slightly more general, a preferred embodiment is determined by the functions:

$$Sph(c_2^0, c_2^{-2}, c_2^2, \{c_n^m\}) = sph(c_2^0 + \Delta c_2^0, c_2^{-2} + \Delta c_2^{-2}, c_2^2 + \Delta c_2^2)$$

$$cyl(c_2^0, c_2^{-2}, c_2^2, \{c_n^m\}) = cyl(c_2^{-2} + \Delta c_2^{-2}, c_2^2 + \Delta c_2^2)$$

$$A(c_2^0, c_2^{-2}, c_2^2, \{c_n^m\}) = a(c_2^{-2} + \Delta c_2^{-2}, c_2^2 + \Delta c_2^2)$$

in which the changes $\Delta c_2^0$, $\Delta c_2^{-2}$, $\Delta c_2^2$ are functions (particularly continuous functions) of the higher-order Zernike coefficients $c_n^m$ of the wavefront, where $n \geq 3$.

Preferably, collecting refraction data comprises collecting first refraction data for a first object distance and second refraction data for a second object distance. Specifically, the influence of the object distance on the pupil size can be taken into consideration individually. In this way, a changed pupil size mainly influences the higher-order aberrations.

Preferably, the method further comprises:
specifying an object distance model A1(x,y), where A1 designates the object distance and (x,y) a visual point or visual spot of the spectacle lens in a specified or specifiable direction of sight;
specifying a function $r_0 = g(A1)$, which describes the dependence of a pupil size $r_0$ on the object distance A1;
determining a pupil size for the at least one main ray on the basis of the object distance model A1(x,y) and the specified function $r_0 = g(A1)$.

Preferably, the spectacle lens to be optimized is a progressive spectacle lens.

In a further aspect, the invention provides an apparatus for calculating and optimizing a spectacle lens for at least one eye of a spectacle wearer, comprising:
a data interface for collecting refraction data of the at least one eye of the spectacle wearer;
a modelling module for defining an individual eye model, which defines at least
the topography of a corneal front surface of the at least one eye,
position and power of a lens of the eye, and
a retina position of the eye such that the eye exhibits the collected refraction data;
a surface model database for specifying a first surface and a second surface for the spectacle lens to be calculated or optimized;
a main ray determination module for determining the path of a main ray through at least one visual point (i) of at least one surface of the spectacle lens to be calculated or optimized;
an object model modelling module for specifying a spherical wavefront ($w_0$) incident on the first surface of the spectacle lens along the main ray;
a wavefront calculation module for determining a wavefront ($w_e$) in the at least one eye, which results from the spherical wavefront in a surrounding of the main ray due to the power of at least the first and second surfaces of the spectacle lens, the corneal front surface, and the lens of the at least one eye;
an optimization module adapted to iteratively vary the at least one surface of the spectacle lens to be calculated or optimized until an aberration of the resulting wavefront corresponds to a specified target aberration.

Further, the invention provides a computer program product adapted, when loaded and executed on a computer, to perform a method for calculating or optimizing a spectacle lens according to the present invention, particularly in a preferred embodiment thereof.

Moreover, the invention provides a storage medium with a computer program stored thereon, the computer program being adapted, when loaded and executed on a computer, to perform a method for calculating or optimizing a spectacle lens according to the present invention, particularly in a preferred embodiment thereof.

In addition, the invention provides a method for producing a spectacle lens, comprising:
calculating or optimizing a spectacle lens according to the method for calculating or optimizing a spectacle lens according to the present invention, particularly in a preferred embodiment thereof;
manufacturing the thus calculated or optimized spectacle lens.

Moreover, the invention provides an apparatus for producing a spectacle lens, comprising:
calculating and optimizing means adapted to calculate or optimize the spectacle lens according to a method for calculating or optimizing a spectacle lens according to the present invention, particularly in a preferred embodiment thereof;
machining means adapted to finish the spectacle lens.

Further, the invention provides a use of a spectacle lens, produced according to the production method of the present invention, particularly a preferred embodiment thereof, in a predetermined average or individual wearing position of the spectacle lens in front of the eyes of a specific spectacle wearer, for correcting a visual defect of the spectacle wearer.

Preferred embodiments of the invention will be described by way of example in the following with reference to the accompanying drawings, which show.

Other than in conventional methods, which are based on the proven model of spectacle lens and refractive deficit of the eye for describing and calculating the aberrations of the system spectacle lens-eye, the invention provides a method that can be illustrated by means of a completely new and individual eye model. For example, in the approach according to the invention, the wavefronts are evaluated only after passing through further optical refractive surfaces or elements, which represent an individual eye model. In this individual eye model, the evaluation of the wavefront aberrations and their effects on vision upon image-formation through the spectacle lens and the eye is performed only after the last calculation in the imaging system of the individual eye model according to the invention.

In this way, all effective aberrations including the higher-order aberrations can be considered directly in the exit pupil of the eye for the first time in the optimization and calculation of a spectacle lens. In particular, preferably also the influence of the corneal front surface and the eye lens on the higher-order aberrations is taken into consideration in the calculation of the resulting wavefront. Only in the evaluation of the resulting wavefront is a transformation to a spherocylindrical combination, i.e. to transformed aberrations of $1^{st}$ and $2^{nd}$ order, in which the higher-order aberrations are taken into account as well, performed. Preferred examples of this transformation in favor or a stable and quickly converging optimization process have already been mentioned further above.

In conventional optimization processes, such a transformation (i.e. a corresponding evaluation of a wavefront) already needs to be performed at the vertex sphere or the entrance pupil of the eye in order to be able to evaluate a target function in an equally stable way. An influence of the corneal front surface and/or the eye lens on the higher-order aberrations cannot be taken into account in the same way anymore. As part of the invention it has been found, however, that this is precisely what enables a substantial improvement of the individual adaptation of a spectacle lens, in particular if the eye does not have negligible higher-order aberrations anymore. But already the influence of an eye not having strong higher-order aberrations itself on higher-order wavefront aberrations caused by the spectacle lens to be produced can be considered very efficiently with the approach according to the invention for the first time.

In a preferred embodiment, the wavefront propagation along a main ray from a predetermined object point through the spectacle lens, the cornea of the eye, the anterior eye chamber, and the eye lens to the retina or exit pupil of the eye is calculated for each visual point (evaluation point). Specifically, the method preferably comprises the following calculation steps:

1. Tracing of a main ray for a visual point of the spectacle lens, from the object point through the ocular center of rotation. This step can be performed analogously to corresponding calculations in conventional ray tracing methods.
2. Setting up the spherical wavefront outgoing from the object point at the front surface of the spectacle lens. The wavefront curvature corresponds to the reciprocal of the distance of the object point from the front surface of the spectacle lens. Thus, the object point forms the center of the spherical wavefront.
3. Calculating the refracted wavefront in a surrounding of the main ray after its passages through the front surface.
4. Calculating the propagated wavefront in a surrounding of the main ray after its passage through the spectacle lens to the back surface.
5. Calculating the refracted wavefront in a surrounding of the main ray after its passage through the back surface.
6. Calculating the propagated wavefront in a surrounding of the main ray after its propagation from the spectacle lens back surface to the corneal front surface.
7. Calculating the refracted wavefront in a surrounding of the main ray after its passage through the corneal front surface.
8. Calculating the propagated wavefront in a surrounding of the main ray after its passage through the cornea to the corneal back surface.
9. Calculating the refracted wavefront in a surrounding of the main ray after its passage through the corneal back surface. In a preferred embodiment, the corneal back surface is assumed to be the spherical surface.
10. Calculating the propagated wavefront in a surrounding of the main ray after its propagation to the eye lens, i.e. in the anterior eye chamber.
11. Calculating the refracted wavefront in a surrounding of the main ray after its passages through the eye lens. In a preferred embodiment, this step in turn comprises several sub-steps particularly for calculating the refraction on the lens front surface, the propagation in the eye lens, and the refraction on the lens back surface.
12. Evaluating the wavefront (resulting wavefront) exiting the eye lens. This evaluation is preferably performed by a corresponding evaluation of a target function.

Figure 1:
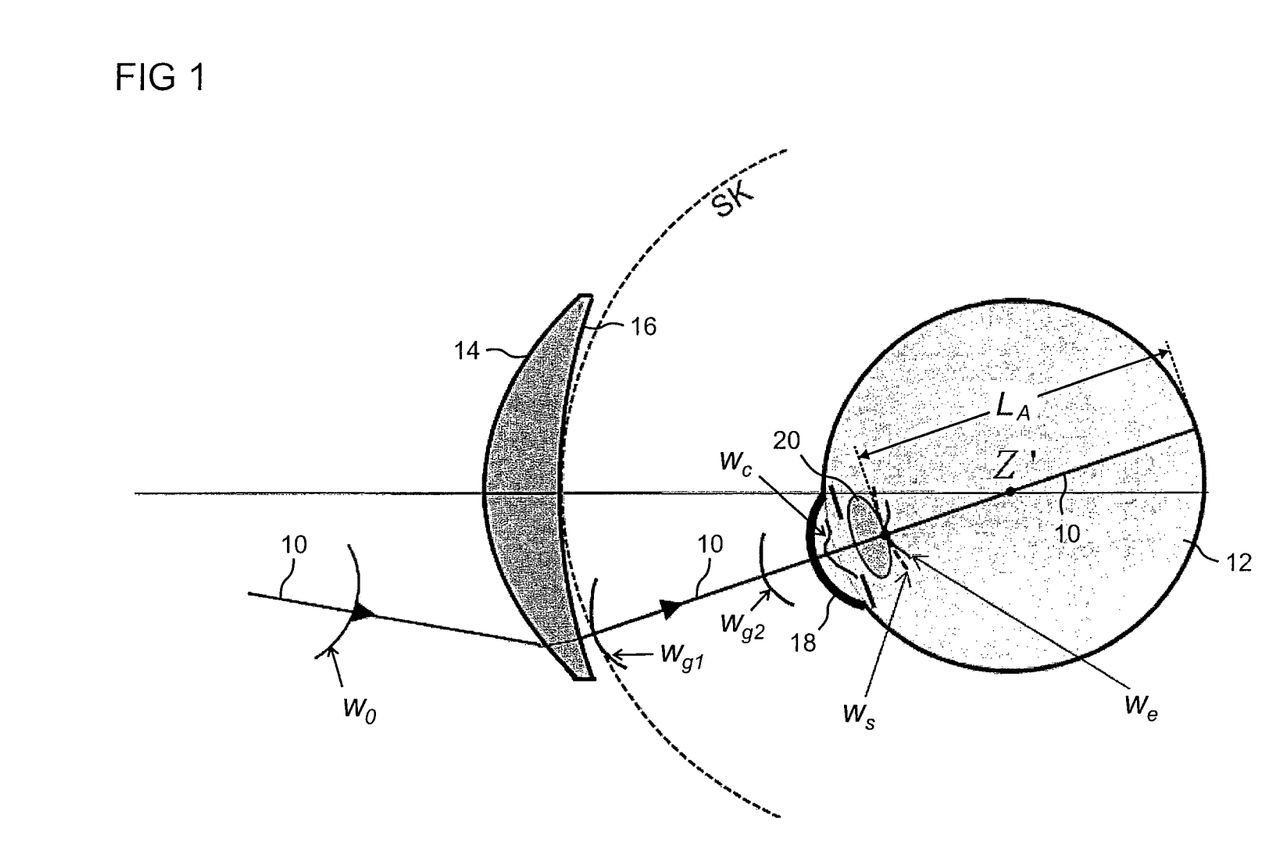
FIG. 1 a schematic illustration of the physiological and physical model of a spectacle lens along with a ray path in a predetermined wearing position.

FIG. 1 shows a schematic illustration of the physiological and physical model of a spectacle lens in a predetermined wearing position along with an exemplary ray path, on which an individual spectacle lens calculation or optimization according to a preferred embodiment of the invention is based.

Here, preferably only one single ray (the main ray 10 that preferably passes through the ocular center of rotation Z') is calculated per visual point of the spectacle lens, but further also the derivatives of the vertex depths of the wavefront according to the transversal coordinates (perpendicular to the main ray). These derivatives are taken into consideration up to the desired order, wherein the second derivatives describe the local curvature properties of the wavefront and the higher derivatives are related to the higher-order aberrations.

In the tracing of light through the spectacle lens up into the eye 12 according to the individually provided eye model, the local derivatives of the wavefronts are ultimately determined at a suitable position in the ray path in order to compare them with the spherical wavefront there, the center of curvature thereof being on the retina of the eye 12. In a preferred embodiment, this position is for example the back surface of the eye lens 20 and/or the exit pupil of the eye 12, which is/are in front of the retina at a distance $L_A$.

To this end, it is assumed that a spherical wavefront $w_0$ originates from an object point and propagates to the first spectacle lens surface 14. There, it is refracted and subsequently it propagates to the second spectacle lens surface 16, where it is refracted again. The wavefront $w_{g1}$ exiting the spectacle lens subsequently propagates along the main ray toward the eye 12 (propagated wavefront $w_{g2}$) until it hits the cornea 18, where it is refracted again (wavefront $w_c$). After a further propagation within the anterior eye chamber to the eye lens 20, the wavefront is refracted again by the eye lens 20 as well, whereby the resulting wavefront $W_e$ forms e.g. at the back surface of the eye lens 20 or at the exit pupil of the eye. The resulting wavefront is compared to the spherical reference wavefront $w_s$, and the deviations are evaluated for all visual points in the target function (preferably with corresponding weightings for the individual visual points).

Thus, the visual defect is not only described by a thin spherocylindrical lens anymore, as this was common in conventional methods, but preferably the corneal topography, the eye lens, the distances in the eye, and the deformation of the wavefront (including the lower-order aberrations—i.e. sphere, cylinder, and cylinder axis—and preferably also including the higher-order aberrations) in the eye are directly considered. If available (e.g. from IOL master measurements), the actual distances in the eye are used. Otherwise, eye models known from literature (Gullstrand's eye, Indiana eye model, eye having length-related defective vision) can be used. For example, reference is made to Atchinson, Smith "Optics of the Human Eye", Butterworth Heinemann (2000). It indicates exemplary variables particularly with respect to the lengths (e.g. distances between the optical elements, eye length), surface refractive powers, refractive indices, etc., which—as far as corresponding variables are not measured individually and considered in the individual eye model—can be considered for completing the individual eye model.

Preferably, an aberrometer measurement provides the individual wavefront deformations of the real eye having the visual defect for distance and near (deviations, no absolute refractive powers) and the individual mesopic and photopic pupil diameters. From a measurement of the corneal topography (extensive measurement of the corneal front surface), the individual real corneal front surface, which generally makes up almost 75% of the overall refractive power of the eye, is obtained. In a preferred embodiment, it is not required to measure the corneal back surface. It is preferably described in good approximation with a sphere due to the small refractive index difference to the chamber water.

Preferably, the eye lens is not specially measured individually. Instead, the eye lens is preferably calculated such that with the predetermined distances in the eye and the measured corneal topography the measured wavefront aberrations result. For example, it can then be set as a homogenous lens with an atoric surface and a spherical surface. Models with an inhomogeneous configuration of the eye lens (gradient index lens), which are discussed in literature, can be used as well. This is preferably done separately at least for distance and near measurements, and a flexible eye model for each accommodation state or object distance is obtained preferably by a suitable, e.g. linear, interpolation.

For the first time, it is possible to consider the effects of the wavefront deformations on the retinal image-formation quality in the spectacle lens optimization in the best possible way and to minimize the errors or aberrations.

In the following, the propagation of the wavefront according to a preferred embodiment of the present invention will be described in more detail. These statements can e.g. be applied to the propagation of the wavefront between the two spectacle lens surfaces 14, 16 and/or to the propagation of the wavefront from the rear spectacle lens surface 16 to the corneal front surface 18 and/or to the propagation within the cornea and/or to the propagation between cornea and eye lens 20 and/or to a propagation within the eye lens 20 and/or to a propagation between the eye lens 20 and the retina of the eye 12.

Figure 2:
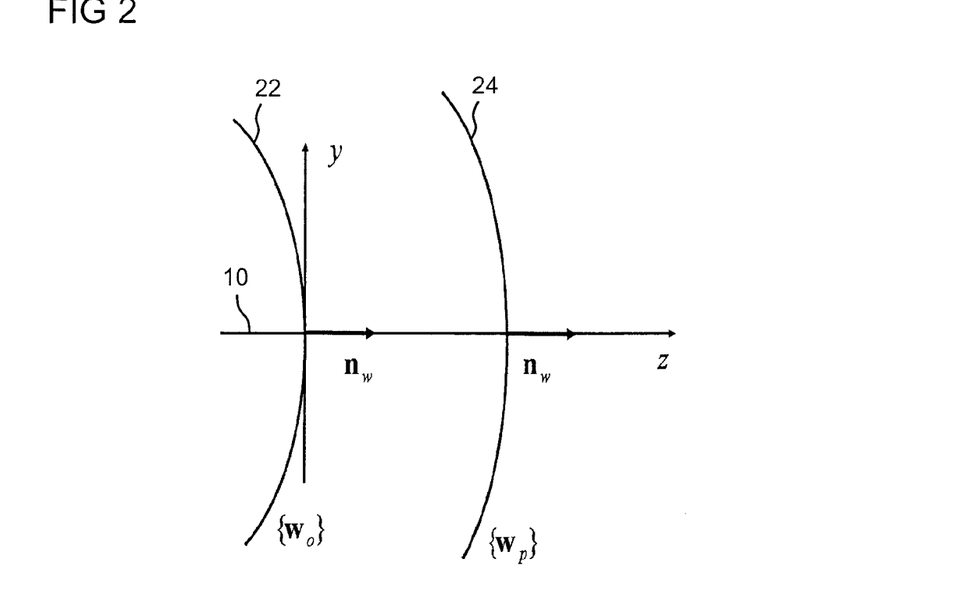
FIG. 2 a schematic illustration of a coordinate system with an original wavefront and a propagated wavefront.

As illustrated in FIG. 2, preferably a Cartesian coordinate system (with an x axis, a y axis, and a z axis) is defined, the origin of which, for a predetermined main ray 10, being at the intersection point of the main ray 10 with the original wavefront 22. The z axis preferably points in the direction of the main ray 10. The directions of the x axis and the y axis are preferably selected to be perpendicular to the z axis and perpendicular to each other such that the coordinate system is right-handed. If the original wavefront is assumed to be a wavefront at a refractive surface, i.e. a surface 14, 16 of the spectacle lens or the corneal front surface 18, the x axis and/or the y axis is preferably selected to be parallel to the surface or surface tangent in the penetration point of the main ray. In another preferred embodiment, the x axis and the y axis are selected to be parallel to the main curvatures of the original wavefront 18.

Preferably, a description of the wavefront according to $$w(x,y) = (x,y,w(x,y)) \quad (1)$$

is assumed, where the value $w(x,y)$ is represented by $$w(x, y) = \sum_{k=0}^{\infty} \sum_{m=0}^{k} \frac{a_{m,k-m}}{m!(k-m)!} x^m y^{k-m} \quad (2)$$

by means of the coefficients $$a_{m,k-m} = \frac{\partial^k}{\partial x^m \partial y^{k-m}} w(x, y)\bigg|_{x=0, y=0} \quad (3)$$

Thus, the connection between the coefficients $a_{k_x,k_y}$ and the local aberrations $E_{k_x,k_y}$ can be described by:

$$E_{k_x,k_y} = n a_{k_x,k_y} E_{2,0} = S_{xx} = n a_{2,0} E_{1,1} = S_{xy} = n a_{1,1} E_{0,2} = S_{yy} = n a_{0,2} E_{3,0} = n a_{3,0}$$

Figure 3:
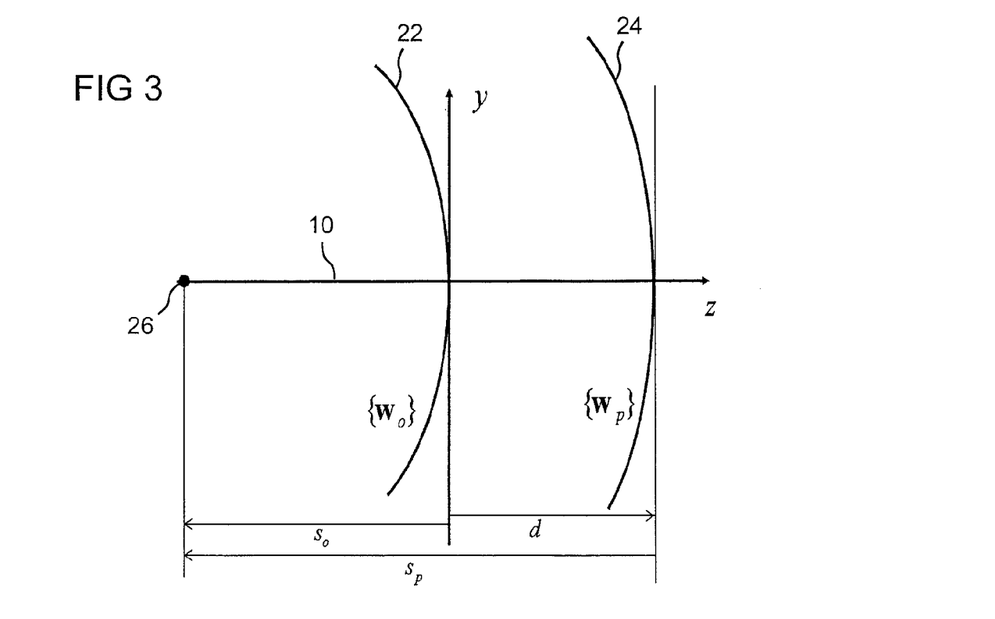
FIG. 3 a schematic illustration of a spherical wavefront with a vergence distance $s_o$ at a distance d from a propagated wavefront with the vergence distance $s_p$.

For aberrations up to the second order, the propagation of a spherical wavefront with the vergence $S_O = n/s_o$ of the original wavefront in a surrounding around a main ray can preferably be expressed in a known manner by the propagation equation $$S_p = \frac{1}{1 - \frac{d}{n} S_o} S_o \quad (4)$$

where $S_p = n/s_p$, designates the vergence of the propagated wavefront. As illustrated in FIG. 3, $s_o$ and $s_p$ designate the vertex distance of the original wavefront 18 and the propagated wavefront 20, respectively, (distance along the main ray 10 from the wavefront to the object point 26). n designates the refractive index and d the propagation distance.

By an extension to three dimensions, the spherocylindrical form of the wavefront can be represented as follows. First of all, the curvatures $1/s_o$ and $1/s_p$ are identified with the second derivatives of the vertex depths of the original wavefront 18 and the propagated wavefront 20, respectively. In the three-dimensional representation, the two derivatives $w_o^{(2,0)} = \partial^2 w_o/\partial x^2$, $w_o^{(1,1)} = \partial^2 w_o/\partial x \partial y$ and $w_o^{(0,2)} = \partial w_o/\partial y^2$ for the original wavefront 18 and correspondingly for the propagated wavefront 20 are respectively summarized in form of a vergence matrix:

$$S_o = \begin{pmatrix} S_{oxx} & S_{oxy} \\ S_{oxy} & S_{oyy} \end{pmatrix} = n \begin{pmatrix} w_o^{(2,0)} & w_o^{(1,1)} \\ w_o^{(1,1)} & w_o^{(0,2)} \end{pmatrix}, \quad (5)$$

$$S_p = \begin{pmatrix} S_{pxx} & S_{pxy} \\ S_{pxy} & S_{pyy} \end{pmatrix} = n \begin{pmatrix} w_p^{(2,0)} & w_p^{(1,1)} \\ w_p^{(1,1)} & w_p^{(0,2)} \end{pmatrix}$$

According to $$S_{oxx} = \left(Sph + \frac{Cyl}{2}\right) - \frac{Cyl}{2}\cos 2\alpha \quad (6)$$

$$S_{oxy} = -\frac{Cyl}{2}\sin 2\alpha$$

-continued
$$S_{o_{yy}} = \left(Sph + \frac{Cyl}{2}\right) + \frac{Cyl}{2}\cos 2\alpha$$

(and analogously for the propagated wavefront) the components of the respective vergence matrix are related to the known variables of spherical power Sph, the magnitude Cyl of cylindrical power, and the cylinder axis α of the cylindrical power. By means of the representation in form of the vergence matrix, by analogy with equation (4), the propagation of an astigmatic wavefront can be represented via the generalized propagation equation $$S_P = \frac{1}{1 - \frac{d}{n}S_o}S_o \quad (7)$$

with the identity matrix $$1 = \begin{pmatrix} 1 & 0 \\ 0 & 1 \end{pmatrix}.$$

Equivalent to this representation in form of the vergence matrix, there can be introduced in the three-dimensional vector space for the original wavefront 22 and the propagated wavefront 24 as power vectors:

$$s_o = \begin{pmatrix} S_{oxx} \\ S_{oxy} \\ S_{oyy} \end{pmatrix} = n \begin{pmatrix} w_o^{(2,0)} \\ w_o^{(1,1)} \\ w_o^{(0,2)} \end{pmatrix}, \quad s_p = \begin{pmatrix} S_{pxx} \\ S_{pxy} \\ S_{pyy} \end{pmatrix} = n \begin{pmatrix} w_p^{(2,0)} \\ w_p^{(1,1)} \\ w_p^{(0,2)} \end{pmatrix} \quad (8)$$

For consideration of higher-order aberrations for the propagation of the wavefront, corresponding vectors $e_k$ of the dimension k+1 can be introduced:

$$e_{ok} = \begin{pmatrix} E_{ox \ldots xx} \\ E_{ox \ldots xy} \\ \vdots \\ E_{oy \ldots yy} \end{pmatrix} := n \begin{pmatrix} w_o^{(k,0)} \\ w_o^{(k-1,1)} \\ \vdots \\ w_o^{(0,k)} \end{pmatrix}, \quad (9)$$

$$e_{pk} = \begin{pmatrix} E_{px \ldots xx} \\ E_{px \ldots xy} \\ \vdots \\ E_{py \ldots yy} \end{pmatrix} := n \begin{pmatrix} w_p^{(k,0)} \\ w_p^{(k-1,1)} \\ \vdots \\ w_p^{(0,k)} \end{pmatrix}$$

However, it is not absolutely necessary to perform the refraction and propagation on the basis of a description of the wavefronts via their local derivatives. Alternatively, it would basically be possible to perform e.g. only the refraction by means of a description of wavefronts and to perform the propagation by ray tracing in a conventional way, as is done in WO 2008/089999 A1. Other than in the approach according to the invention, the evaluation of the wavefront or ray tracing there is also performed in an established conventional way e.g. at the vertex sphere or the entrance pupil of the eye.

Figure 4:
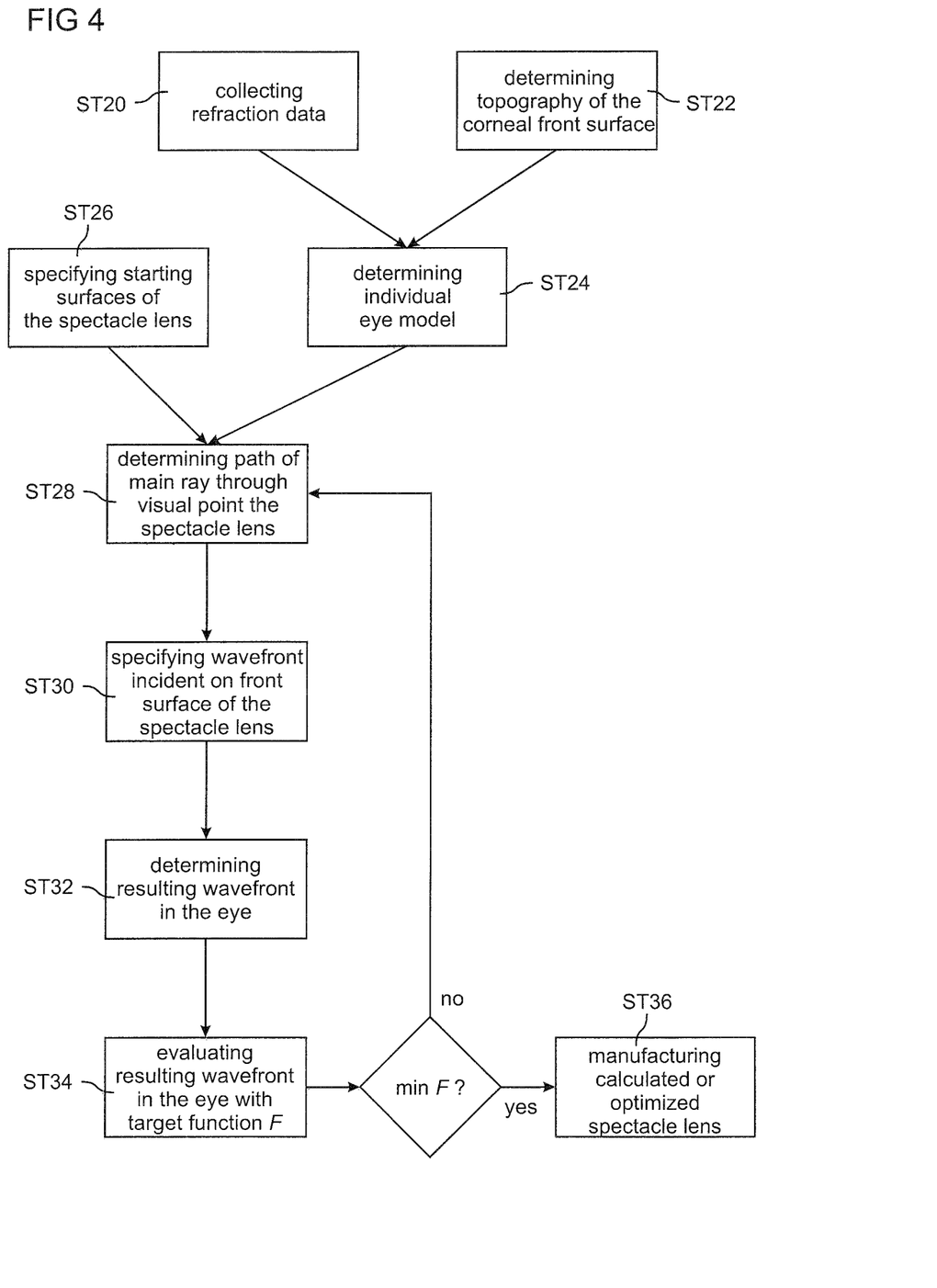
FIG. 4 a flow chart for illustrating a method for optimizing an individual spectacle lens according to an embodiment of the invention.

FIG. 4 illustrates an exemplary method for individually optimizing a spectacle lens. Here, higher-order aberrations (HOA) of both the spectacle lens and the eye are preferably taken into consideration as well.

Preferably, in an individual refraction determination ST20 for the eye of the spectacle wearer, not only the values for sphere, cylinder, and cylinder axis, particularly for distance and near vision, are determined subjectively, but additionally the higher-order aberrations, which are e.g. described by Zernike coefficients ($c_2^0, c_2^2, c_2^{-2}, \ldots$), are described with an aberrometer. Preferably, determining the individual refraction ST20 further comprises determining an individual pupil size, in particular depending on the direction of sight or the object distance.

Moreover, in the illustrated preferred embodiment, the individual topography of the corneal front surface of the eye is measured (ST22). Further geometric data of the eye, e.g. distance between corneal front surface and the eye lens and/or distance of the eye lens from the retina and/or shape of the corneal back surface, are preferably deposited in a database as default values and retrieved from there to determine an individual eye model in step ST24. Further preferably individual parameters e.g. relating to the positioning of the spectacle lens in front of the eye of the spectacle wearer (e.g. corneal vertex distance, forward inclination, face form angle, etc.) are considered in the determination of the individual eye model for specifying the overall optical system of spectacle lens and model eye.

The individual eye model is at least created such that due to the interaction of at least the corneal front surface and the eye lens in their position relative to the retina of the eye, the individually determined refraction of the eye is achieved. In this way, the required power of the eye lens is calculated preferably from the individually determined refraction and the individually determined topography of the corneal front surface. If e.g. an astigmatism of the eye, which is caused (at least not completely) by the measured topography of the corneal front surface, is measured in the refraction determination, this effect will be attributed to the eye lens in the determination of the individual eye model.

To calculate the spectacle lens to be produced, first of all starting surfaces for the front and back surfaces of the spectacle lens are specified in a position preferably corresponding to the individual situation of wear in front of the model eye (step ST26). On the basis of these starting surfaces and the individual eye model, a determination of the path of a main ray, which particularly passes through the ocular center of rotation (for a direction of sight of the eye corresponding to the evaluation point), is performed particularly for each evaluation point of the spectacle lens (step ST28).

Further, a diverging spherical wavefront incident on the spectacle lens front surface is specified for each evaluation point (step ST30), the center of curvature of said spherical wavefront being on the main ray at an object distance indicated preferably by an individually specified or selected object distance model. Thus, this spherical wavefront describes the light emerging from the corresponding object point.

The wavefront now passes at least through the two spectacle lens surfaces, the corneal front surface, and the eye lens along the respective main ray, wherein it is refracted at each boundary surface and propagates undisturbedly between the boundary surfaces, for example. Since the boundary surfaces and distances are at least partly individually specified particularly by the individual eye model, a resulting wavefront behind the eye lens is determined from the specified spherical wavefront in step ST32.

Subsequently, the resulting wavefront is evaluated (step ST34). Particularly preferably, on the basis of the individual pupil size for the respective direction of sight, a transformation of the coefficients of the resulting wavefront (e.g. Zernike coefficients) to a spherocylindrical representation of the resulting aberrations is performed, i.e. transformed values (i.e. also "combined values") of sphere, cylinder, and cylinder axis are determined, said values representing a desired adaptation to the resulting wavefront in a surrounding of the main ray determined by the pupil size. In the evaluation of the resulting wavefronts, the higher-order wavefront aberrations are preferably not considered explicitly in a target function anymore, but are preferably only indirectly taken into account in the target function via the transformation to the spherocylindrical combination. The evaluation of the resulting wavefront is performed particularly on the basis of a comparison with a reference wavefront, in particular a spherical wavefront converging up to the retina along the respective main ray.

If the target function is not minimized sufficiently (and there is no stop criterion for the optimization process), the surface of the spectacle lens to be optimized is varied and the process starts again with the determination of the main ray path in step ST28 on the basis of the at least one varied surface (e.g. with an unchanged front surface and a changed back surface).

As soon as the target function is minimized sufficiently in step ST34, the spectacle lens surfaces can be output e.g. in the form of vertex depths and the spectacle lens can be manufactured accordingly (ST36).

LIST OF REFERENCE NUMERALS

10 main ray
12 eye
14 first surface of the spectacle lens (front surface)
16 second surface of the spectacle lens (back surface)
18 corneal front surface
20 eye lens
22 original wavefront
24 propagated wavefront
26 object point

The invention claimed is:

1. A computer-implemented method for producing a spectacle lens by calculating or optimizing the spectacle lens for at least one eye of a spectacle wearer, the method comprising:
   providing a refraction data storage device configured to store measured refraction data of the at least one eye of the spectacle wearer;
   defining, by a computer, an individual eye model, which defines at least:
      the topography of a corneal front surface of the at least one eye,
      position and power of a lens of the eye, and
      a retina position of the eye
   such that the eye model exhibits the collected refraction data;
   specifying, by the computer, a first surface and a second surface for the spectacle lens to be calculated or optimized and a power of at least the first and second surfaces of the spectacle lens from data stored in a database;
   determining, by the computer, a path of a main ray through at least one visual point of at least one spectacle lens surface to be calculated or optimized;
   specifying, by the computer, a spherical wavefront incident on the first surface of the spectacle lens along the main ray;
   determining, by the computer, a wavefront in the at least one eye, which results from the spherical wavefront in a surrounding of the main ray due to the power of at least the first and second surfaces of the spectacle lens, the corneal front surface, and the lens of the at least one eye;
   iteratively varying, by the computer, the at least one spectacle lens surface to be calculated or optimized until an aberration of the resulting wavefront corresponds to a specified target aberration; and
   manufacturing the thus calculated or optimized spectacle lens on a manufacturing machine.

2. The method according to claim 1, wherein defining the individual eye model comprises:
   specifying a plurality of refractive surfaces of the eye, at least one of which being described by a set of parameters; and
   determining, by the computer, individual values for the set of parameters such that the eye of the eye model exhibits the collected refraction data.

3. The method according to claim 1,
   wherein the collecting refraction data of the at least one eye comprises measuring the refraction data by means of light of a measurement wavelength, and
   wherein defining the individual eye model comprises:
   defining a wavelength dependency of at least one optical element of the individual eye model; and
   determining, by the computer, a geometry of the optical element such that the eye of the eye model exhibits the measured refraction data for the defined wavelength dependency and for the measurement wavelength.

4. The method according to claim 1, wherein defining an individual eye model comprises:
   Collecting individual topographic data of the corneal front surface and/or of an individual retina position of the at least one eye; and
   determining, by the computer, the power of the lens of the eye such that the eye in the eye model exhibits a refraction according to the collected refraction data of the spectacle wearer.

5. The method according to claim 1, wherein the resulting wavefront is determined by means of wavefront tracing.

6. The method according to claim 1, wherein the determining the resulting wavefront comprises:
   calculating a wavefront refracted at the first surface of the spectacle lens from the specified spherical wavefront and the specified first surface;
   calculating a wavefront propagated through the spectacle lens along the main ray from the calculated wavefront refracted at the first surface;
   calculating a wavefront refracted at the second surface of the spectacle lens from the calculated wavefront, propagated through the spectacle lens, and the specified second surface;
   calculating a wavefront propagated along the main ray to the corneal front surface from the calculated wavefront refracted at the second surface;
   calculating a wavefront refracted at the corneal front surface from the calculated wavefront, propagated to the corneal front surface, and the topography of the corneal front surface defined by the individual eye model;

calculating a wavefront propagated along the main ray to the lens from the calculated wavefront refracted at the corneal front surface; and calculating a wavefront refracted by the lens from the calculated wavefront propagated to the lens, and the power of the lens defined by the individual eye model.

7. The method according to claim 1, wherein the iteratively varying the at least one spectacle lens surface to be calculated or optimized comprises minimizing a target function.

8. The method according to claim 1, wherein the collecting refraction data comprises collecting data relating to the spherical power, the magnitude of the astigmatism, the astigmatism axis, and at least one further higher-order refraction of the eye.

9. The method according to claim 8, wherein the collecting refraction data comprises collecting first refraction data for a first object distance and second refraction data for a second object distance.

10. The method according to claim 1, further comprising:
specifying an object distance model Al(x, y), where Al designates an object distance and (x,y) a visual point or visual spot of the spectacle lens in a specified or specifiable direction of sight;
specifying a function r0=g(AI), which describes a dependence of a pupil size r0 on the object distance Al; and
determining a pupil size for the main ray on the basis of the object distance model Al(x, y) and the specified function r0=g(AI).

11. The method according to claim 1, wherein the spectacle lens to be optimized is a progressive spectacle lens.

12. A non-transitory storage medium with a computer program stored thereon, wherein the computer program is adapted, when loaded and executed on a computer, to perform a method for calculating or optimizing a spectacle lens according to claim 1.

13. An apparatus for calculating or optimizing a spectacle lens for at least one eye of a spectacle wearer, comprising:
a refraction data storage device configured to store measured refraction data of the at least one eye of the spectacle wearer;
a computer in communication with the refraction data storage device and comprising: one or more processors; and
a memory configured to store a program of instructions executable by the processors for:
a data interface adapted to collect refraction data of the at least one eye of the spectacle wearer;
a modeler adapted to define an individual eye model, which defines at least:
the topography of a corneal front surface of the at least one eye,
position and power of a lens of the eye, and
a retina position of the eye
such that the eye model exhibits the collected refraction data;
a surface lens specifier to specify a first surface and a second surface for the spectacle lens to be calculated or optimized and a power of at least the first and second surfaces of the spectacle lens from data stored in a database;
a main ray determiner adapted to determine a path of a main ray through at least one visual point of at least one spectacle lens surface to be calculated or optimized;
an object modeler adapted to specify a spherical wavefront incident on the first surface of the spectacle lens along the main ray;
a wavefront calculator adapted to determine a wavefront in the at least one eye, which results from the spherical wavefront in a surrounding of the main ray due to the power of at least the first and second surfaces of the spectacle lens, the corneal front surface, and the lens of the at least one eye; and
an optimizer adapted to iteratively vary the at least one spectacle lens surface to be calculated or optimized until an aberration of the resulting wavefront corresponds to a specified target aberration.

14. An apparatus for producing a spectacle lens, comprising:
a refraction data storage device configured to store measured refraction data of the at least one eye of the spectacle wearer;
a computer in communication with the refraction data storage device and comprising:
one or more processors; and
a memory configured to store a program of instructions executable by the processors for:
a calculator or optimizer adapted to calculate or optimize the spectacle lens according to a method for calculating or optimizing a spectacle lens for at least one eye of a spectacle wearer by:
collecting refraction data of the at least one eye of the spectacle wearer;
defining an individual eye model, which defines at least:
the topography of a corneal front surface of the at least one eye,
position and power of a lens of the eye, and
a retina position of the eye
such that the eye model exhibits the collected refraction data;
specifying a first surface and a second surface for the spectacle lens to be calculated or optimized and a power of at least the first and second surfaces of the spectacle lens from data stored in a database;
determining a path of a main ray through at least one visual point of at least one spectacle lens surface to be calculated or optimized;
specifying a spherical wavefront incident on the first surface of the spectacle lens along the main ray;
determining a wavefront in the at least one eye, which results from the spherical wavefront in a surrounding of the main ray due to the power of at least the first and second surfaces of the spectacle lens, the corneal front surface, and the lens of the at least one eye;
iteratively varying the at least one spectacle lens surface to be calculated or optimized until an aberration of the resulting wavefront corresponds to a specified target aberration; and
a manufacturing machine adapted to manufacture the calculated or optimized spectacle lens.

15. A computer-implemented method for producing a spectacle lens by calculating or optimizing the spectacle lens for at least one eye of a spectacle wearer, the method comprising:
collecting refraction data of the at least one eye of the spectacle wearer;
defining, by a computer, an individual eye model, which defines at least:
the topography of a corneal front surface of the at least one eye,
position and power of a lens of the eye, and
a retina position of the eye
such that the eye model exhibits the collected refraction data;

specifying, by the computer, a first surface and a second surface for the spectacle lens to be calculated or optimized and a power of at least the first and second surfaces of the spectacle lens from data stored in a database;

determining, by the computer, a path of a main ray through at least one visual point of at least one spectacle lens surface to be calculated or optimized;

specifying, by the computer, a spherical wavefront incident on the first surface of the spectacle lens along the main ray;

determining, by the computer, a wavefront in the at least one eye, which results from the spherical wavefront in a surrounding of the main ray due to the power of at least the first and second surfaces of the spectacle lens and the corneal front surface, of the at least one eye;

iteratively varying, by the computer, the at least one spectacle lens surface to be calculated or optimized until an aberration of the resulting wavefront corresponds to a specified target aberration; and manufacturing the thus calculated or optimized spectacle lens on a manufacturing machine.

* * * * *